United States Patent Office 2,962,357
Patented Nov. 29, 1960

2,962,357

DEFLUORINATION OF PHOSPHORIC ACID

William B. Williams, Evanston, Ill., and Donald E. Tynan, Lakeland, Fla., assignors to International Minerals & Chemical Corporation, a corporation of New York No Drawing. Filed Feb. 18, 1957, Ser. No. 640,606

2 Claims. (Cl. 23—165)

This invention relates to the removal of fluorine from acidic phosphate solutions. More particularly, it relates to the removal of fluorine from phosphoric acid by means of gaseous entrainers. Still more particularly, it relates to the defluorination of phosphoric acid by a combination of combustion gases and steam.

Wet process phosphoric acid is prepared by the digestion of phosphate rock with a mineral acid such as sulfuric acid. This phosphoric acid is a highly contaminated solution containing iron and aluminum and fluorine compounds in solution. The fluorine content which ranges from about 0.5% to about 2.5% of fluorine in solution, is too high a content for use in the manufacture of animal feeds. Use to which phosphoric acid is put naturally determines the purification steps.

Defluorination of phosphoric acid is disclosed by Hettrich, United States Patent No. 2,165,100, who boils phosphoric acid at a temperature of about 280 to 290° F. by passage therethrough of steam, superheated to a temperature of about 400 to about 700° F. This process has not been a commercial success because of the uneconomically large quantities of steam required and because of the cost of superheating these large volumes of steam.

It is a primary object of this invention to overcome the shortcomings and disadvantages of steam defluorination processes heretofore known.

It is another object of this invention to provide a process of defluorinating phosphoric acid wherein the fluorine is driven-off in vapor form.

It is a further object of this invention to provide a process wherein defluorination is accomplished during the process of concentrating the acid.

It is a still further object of this invention to provide a process wherein the steam can be either saturated or slightly superheated and at a temperature slightly above the boiling temperature of the phosphoric acid.

These and other objects of the invention will be apparent to those skilled in the art from the following description.

It has been discovered that passage of combustion gases in conjunction with steam through wet process phosphoric acid while the acid is boiling and being concentrated at $P_2O_5$ concentration levels higher than about 48% $P_2O_5$, effectively lowers the fluorine content of the acid.

In carrying out the process, phosphoric acid is manufactured by the reaction of phosphate rock with sulfuric acid. This so-called "wet process" phosphoric acid generally contains between about 24% and about 30% $P_2O_5$, 1 to 3% fluorine, and some iron and aluminum phosphates. Passage of steam through phosphoric acid solutions of a $P_2O_5$ concentration of 24 to about 46% in large volume per unit of $P_2O_5$ treated, removes only relatively insignificant amounts of fluorine giving an analysis generally of the order of:

| | Percent |
|---|---|
| $P_2O_5$ | 46 |
| $Fe_2O_3$ | 1.8 |
| $Al_2O_3$ | 2.1 |
| Sulfate | 2.2 |
| Fluorine | 1.3 |

This type of acid, in the new and novel process, is concentrated by submerged combustion evaporation. In this type of evaporation, the gaseous products of combustion pass directly through the liquor giving a direct transfer or interchange of heat and causing a violent boiling of the acid. When acid has been concentrated to a $P_2O_5$ concentration of about 48 to 56%, steam sparging is initiated. The steam passing through the acid is generally at a temperature of about 275° F. to 400° F. and usually at a pressure of 20 to 80 p.s.i. gauge. The combination of gaseous combustion products and steam passing through the violently boiling acid, effects a rapid evolution of 50 to 60% of the fluorine which is entrained in the gaseous mixture. Following this rapid initial evolution of fluorine, the fluorine evolution proceeds at a markedly slower rate. The boiling of the acid by the combustion gases and the sparging of steam are preferably continued until an acid is obtained having a $P_2O_5$ content of between about 50% and about 56% and a P/F weight ratio in the range between about 100 and about 400.

Since there is this shift in fluorine evolution rates, the defluorination operation may be carried out in a isngle stage batch or single stage continuous operation or in a continuous first stage operation followed by a second stage batch operation, the latter mode of operation permitting the greater flexibility in choice of steam rates which in turn can be reflected in more economical operation.

The invention will be more completely understood from the description of apparatus and the mode of operation.

The apparatus for production of defluorinated phosphoric acid comprises a cone bottomed tank. For small operations a cylindrical tank of approximately 3' diameter and about 6' long, with the cone being about 30" long, handles approximately about 150 gallons of liquor. A submerged combustion fuel burner is axially suspended in this tank. Vaporized liquids are withdrawn from the top of the tank by a suitable exhaust system. The fuel burner is set in an elongated combustion chamber and the outlet from said chamber for combustion gases is positioned below the juncture of the cylindrical and conical sections of the tank. A steam conduit is introduced through the cone and connected to a sparge ring. In the above small tank, the ring is positioned 6 to 15 inches below the outlet for gases at the bottom of the combustion chamber and about 18 to 25 inches above the bottom of the cone. This steam sparging ring may be of suitable design, usually for the 30" cone it is of about 18" diameter. In such a unit of 30" diameter, liquid level under quiescent conditions is approximately 27" above the steam sparging ring.

When carrying out the continuous defluorination operation, this unit is filled to the proper liquid level with phosphoric acid obtained in a previous batch defluorination operation or from some other source. This starting acid preferably has a P/F weight ratio close to or exceeding the P/F equilibrium ratio desired in the final product. This acid is heated to boiling by the passage of combustion gases through the liquid with water being added to the system to maintain substantially constant acid concentration until fresh feed is introduced. When the acid has reached proper temperature, i.e., usually 275 to 310° F., dilute phosphoric acid, which has not previously been defluorinated, is introduced into the evaporator unit at a rate of 2 to 6 units of $P_2O_5$ per hour or more, depending upon the quantity of steam being passed through the liquid, and the extent of supplemental heating.

In a batch operation, the unit is filled with dilute acid, i.e., 24% $P_2O_5$ or higher concentration, and the acid heated by the combustion gases in the same manner as in the continuous process. When the acid has attained a concentration of about 48% or higher, sparging of steam is initiated. Steam is then passed through the acid which continues to boil due to the passage of combustion gases therethrough for a period of 3 to about 5 hours. A P/F weight ratio of 200 may be attained by the above-described method in 3 to 4 hours, utilizing 8 to 16 pounds of steam per unit of $P_2O_5$ per hour. Defluorination of 26% $P_2O_5$ acid, having a P/F initially of approximately 6, and when concentrated to 48 has a P/F of approximately 15, requires 45, 55, and 85 pounds of steam per unit of $P_2O_5$ for steam rates of 8.5, 15.7, and 20.8 pounds per unit per hour to attain a product having a P/F of 200.

In order to give a fuller understanding of the invention, but with no intention to be limited thereto, the following specific examples are given to illustrate the character of the invention herein described.

Example I

Phosphoric acid was prepared by the reaction of Florida phosphate rock and sulfuric acid. This acid had a $P_2O_5$ content of approximately 24% and a P/F weight ratio of about 6:1. The acid was concentrated in a vented cylindrical tank having a conical bottom section where the depth of acid solution was about 27". The burner for fuel oil was positioned in the tank in a manner to cause the products of combustion to issue from the burner mechanism below the surface of the acid solution. A sparge ring for steam was positioned 12" below the gaseous outlet from the burner. In this concentrator, the acid was concentrated to a $P_2O_5$ content of about 48% and during this operation, the acid obtained a P/F weight ratio of about 40. The acid concentration operation was continued for 1½ hours while steam, at a temperature of 350° F. and at a pressure of 60 p.s.i. gauge, was sparged through the acid at a rate of 500 pounds per hour. At the end of this period, the acid had a $P_2O_5$ concentration of about 55% and a P/F of about 200.

Example II

A batch of phosphoric acid, concentrated to 41% $P_2O_5$ and a P/F of 15, was introduced into the evaporator equipment described in Example I. The heating and steam sparging apparatus was put in operation, steam being added at a rate of 500 pounds per hour at a temperature of 300° F. When this acid was boiling, due to the passage of combustion gases through the acid, fresh phosphoric acid of approximately 41% $P_2O_5$ content was introduced on a continuous basis at a rate of approximately 4 units of $P_2O_5$ per hour. Simultaneously, there was withdrawn from the concentration equipment, 55.6% $P_2O_5$ acid. This acid, upon analysis, showed a P/F of approximately 215 continuously for a period of 3 hours of operation.

Example III

Wet process phosphoric acid of approximately 55% $P_2O_5$, 4½% free sulfate, and a P/F of 30, was introduced into the evaporator equipment described in Example I. The heating and sparging apparatus were put in operation, the steam and water added being 37 pounds per unit of $P_2O_5$ in the batch being treated. After 2½ hours, during which time water was added to maintain a constant $P_2O_5$ content of 53%, the P/F attained was 200. After 3½ hours, when the steam consumption had reached 52 pounds per unit of $P_2O_5$, a P/F was attained of 400.

Having thus described our invention, what we claim is:

1. A method of defluorinating fluorine-containing wet process phosphoric acid containing at least 48% by weight of $P_2O_5$ and at least 0.5% by weight of fluorine which comprises boiling a liquid body of said acid by introducing hot combustion gases of a hydrocarbon fuel issuing from a burner mechanism beneath the acid surface and passing said hot gases through the acid, said combustion gases being in sufficient quantity to boil the acid by the direct transfer of heat from the combustion gases to the acid, and, simultaneous with the introduction of said hot combustion gases, introducing steam beneath the surface of the liquid acid at a temperature above about 275° F. and in an amount of at least about 45 pounds of steam per unit of $P_2O_5$ thereby effecting an evolution and entrainment of fluorine in the steam and combustion gaseous mixture passing through said acid and increasing the P/F ratio of the acid to at least 100.

2. The method of claim 1 wherein the product is characterized by a $P_2O_5$ content of between about 50% and about 56% and a P/F weight ratio in the range between about 100 and about 400.

References Cited in the file of this patent
UNITED STATES PATENTS

| | | |
|---|---|---|
| 1,597,984 | LaBour | Aug. 31, 1926 |
| 2,124,729 | Castner et al. | July 26, 1938 |
| 2,249,192 | Titlestad et al | July 15, 1941 |
| 2,611,681 | Bellinger | Sept. 23, 1952 |